Dec. 7, 1926.
J. H. MacMAHON
1,609,755
METHOD OF CHLORINATING SOLUTIONS
Filed Jan. 23, 1924
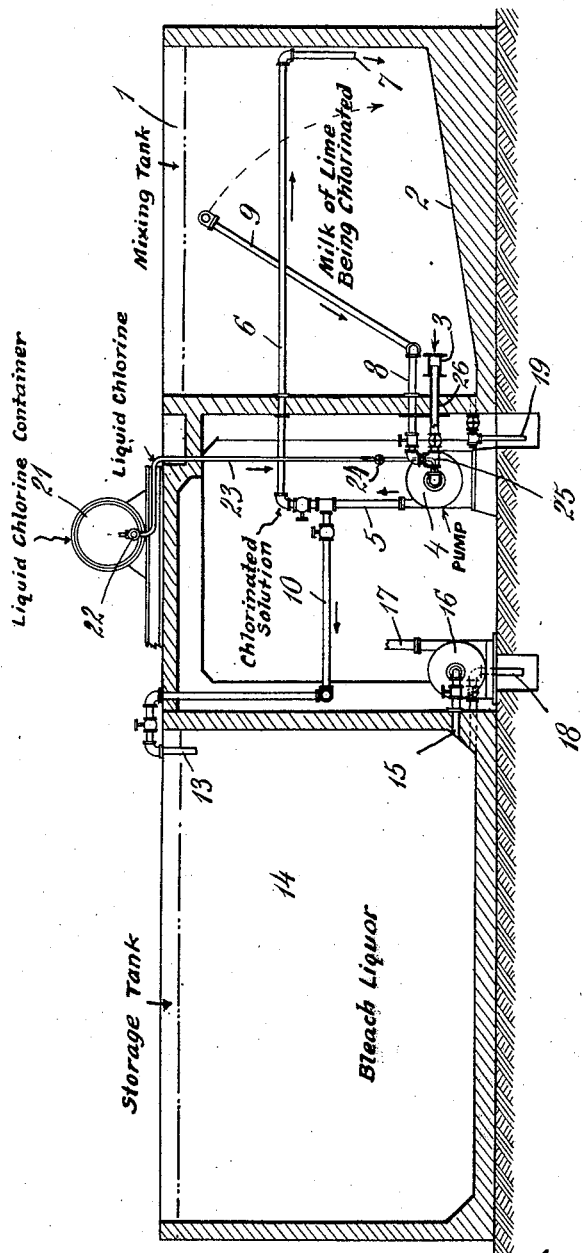
INVENTOR
Jas. H. MacMahon
BY
Pennie Davis Marvin & Edmonds
ATTORNEYS Patented Dec. 7, 1926.

1,609,755

UNITED STATES PATENT OFFICE.

JAMES H. MacMAHON, OF NIAGARA FALLS, NEW YORK, ASSIGNOR TO THE MATHIESON ALKALI WORKS, INC., OF NEW YORK, N. Y., A CORPORATION OF NEW YORK.

METHOD OF CHLORINATING SOLUTIONS.

Application filed January 23, 1924. Serial No. 688,027.

This invention relates to improvements in the preparation of liquid bleach solutions.

The present invention provides an improved method for making liquid bleach solutions from milk-of-lime or other alkaline solutions and liquid chlorine supplied from containers which contain the liquid chlorine under a high pressure.

According to the present invention, the liquid chlorine from the chlorine container is discharged while still in a liquid state, or while still a considerable part of the liquid chlorine remains liquid, directly into the milk-of-lime or other alkaline solution to be chlorinated. The alkaline solution, into which the liquid chlorine is directly introduced, is vigorously agitated to bring about rapid dissemination of the chlorine throughout the alkaline liquor or solution.

When liquid chlorine, which is maintained in the chlorine container under a high pressure, is passed through a pressure reducing valve, some of the chlorine is vaporized because of the reduction in pressure, but a considerable part of the chlorine is cooled and remains in a liquid state at a much lower temperature approximating its boiling point at atmospheric pressure or at the pressure to which the chlorine is reduced by the reducing valve. By introducing the chlorine after expansion directly into the milk-of-lime or other alkaline solution to be chlorinated, the cooling effect due to the expansion as well as the cooling effect due to the low temperature of the liquid chlorine, is transmitted to the solution and serves to neutralize to an important extent the heat of the reaction between the chlorine and the milk-of-lime. The cooling effect, accordingly, will be exerted upon the milk-of-lime solution at the point at which the chlorine is introduced therein and intimately admixed therewith.

In my prior Patent No. 1,426,752 granted August 22, 1922 I have described and claimed a method and apparatus for the production of liquid-bleach solutions wherein the liquid chlorine is conducted either directly into the alkaline solution or first into heat interchanging relation therewith and then into the alkaline solution. When the liquid chlorine is passed through a coil submerged in the milk-of-lime solution, the chlorine is vaporized to the extent that the heating effect of the milk-of-lime solution overcomes or neutralizes the heat of vaporization, so that the cooling effect of the vaporization of the chlorine is exerted upon the body of the milk-of-lime which comes in contact with the vaporizing coil. When, however, the chlorine is introduced directly into the milk-of-lime solution, the cooling effect is exerted for the most part at the point at which the chlorine is introduced into the solution and at the point at which it reacts with the solution. Since the reaction of chlorine with milk-of-lime or other alkaline solutions gives off considerable heat, the direct introduction of the liquid chlorine into the milk-of-lime has the advantage that it makes the cooling effect of the liquid chlorine available at the point or at approximately the point where the heat of reaction is generated. The cooling effect is therefore localized as well as the heat of reaction, and these tend to neutralize each other in a localized area or in the approximate location where the chlorine is introduced and the reaction takes place.

The present invention relates more particularly to processes of the character described in my said prior patent in which the chlorine is directly introduced into the milk-of-lime or other alkaline solutions. If the liquid chlorine is introduced without reduction in pressure into the alkaline solution, the distribution of the chlorine throughout the solution can be effected by rapid mechanical agitation. Ordinarily, however, the milk-of-lime or other alkaline solution to be chlorinated will be at a lower pressure than that of the liquid chlorine in its container; and, in such cases, the chlorine will be passed through a reducing valve or equivalent device to reduce the chlorine to approximately the pressure of the solution to be chlorinated before it is admixed therewith. Since the liquid chlorine in its container is maintained at a temperature approximately atmospheric, any reduction in pressure will tend to vaporize part of the chlorine and to reduce the temperature of the unvaporized liquid chlorine to its vaporizing temperature under the prevailing conditions of temperature and pressure. When the liquid chlorine is passed through an expansion valve and its pressure reduced for example from around 80 lbs. to around 5 lbs. or slightly above atmospheric, a considerable vaporization of the liquid chlorine will take place and a considerable amount of the latent heat of vaporization will be made available in the cold residual liquid and vaporized chlorine. The liquid chlorine can be permitted to vaporize to the maximum extent so that its temperature is lowered to that approximating the boiling point of liquid chlorine at atmospheric or at the predetermined pressure above atmospheric; and the liquid chlorine and vaporized chlorine can then be brought directly in contact with the solution to be chlorinated. With the liquid chlorine and the vaporized chlorine at such a low temperature, they will have a marked cooling effect upon the solution into which they are introduced and this cooling effect will to a very large extent neutralize the heat of reaction, as above pointed out.

Even when the liquid chlorine is not vaporized to any large extent before it is brought into contact with the solution to be chlorinated, yet where the solution is at a much lower pressure than that in the chlorine container, the temperature of the solution will ordinarily be much higher than the vaporizing temperature of the liquid chlorine at the lower pressure, and the liquid chlorine coming in contact with the solution to be chlorinated will tend to a greater or less extent to be vaporized, although some of the chlorine may be directly admixed with and combined with the solution without undergoing intermediate vaporization.

The apparatus for carrying out the process of the invention may vary in its construction. In general, the liquid chlorine container will be directly connected with the container of the solution to be chlorinated so that the liquid chlorine can be directly discharged into the solution. It may thus be atomized in very fine streams directly into the solution, or it may be introduced through an injection nozzle or with a venturi effect, or it may be introduced into a vigorously agitated portion of the solution in which it will be rapidly disseminated.

One advantageous method of introducing the liquid chlorine into the solution is to cause circulation of the solution through a circulating line by means of a circulating pump or equivalent device and to introduce the liquid chlorine directly into the solution in the pump so that the pump will serve as an agitating means for effectively disseminating and distributing the chlorine throughout the alkaline solution.

When a batch of milk-of-lime is to be treated, this may be circulated round and round through a circulating line by means of a pump which draws off the solution at one point and returns it to the main body at another. In such a circulating system, the chlorine can be directly introduced into the circulating line and intimately admixed with the circulating liquor and in this way gradually introduced into the main body of the solution.

An improved apparatus adapted for the practice of the process of the invention is illustrated in a somewhat conventional and diagrammatic manner in the accompanying drawing in vertical section and with part in elevation.

In the apparatus illustrated, the mixing tank 1 has an inclined bottom and an outlet pipe 3 leading to the suction side of a pump 4, which discharges through the pipes 5 and 6, back to the mixing tank through the outlet pipe 7. A separate outlet pipe 8 is provided, also connected to the suction side of the pump, and having a pipe section 9 pivoted thereto in such a way that the upper end of the pipe 9 can be raised or lowered to permit drawing off of the clear settled chlorinated liquor from different levels. The discharge side of the pump is also connected through the pipes 5, 10 and 13 to the stock tank 14 from which the solution can be withdrawn through the pipe 15 and pumped by the pump 16 through the pipe 17, to the place of use of the solution. A clean-out drain 18 is provided for the stock tank 14 and a similar drain pipe 19 is provided at the bottom of the mixing tank 1.

The liquid chlorine is supplied from the container 21 which may be a drum of, for example, 1 ton capacity, and is drawn off through the valve 22 at the bottom of the container so that the vaporization of the chlorine and drawing off of gaseous chlorine from the top of the container is avoided. The liquid chlorine passes through the pipe 23, past the expansion valve 24 where its pressure is reduced and then through the pipe 25 directly into the circulating pump 4 or into the inlet side of this pipe, discharging in such a way as to promote the circulation by an injector action. The rate of flow of the liquid chlorine is regulated by the valve 24, while the flow of liquid through the pipes 3, 5, 6, 8 and 10 is controlled by suitable regulating valves therein. With the flow of liquid chlorine regulated properly, and with the flow of milk-of-lime solution regulated, the liquid chlorine will enter the circulating stream and will be intimately admixed by the pump and the chlorinated solution will then be discharged through the discharge line 6 back into the tank from which the milk-of-line is withdrawn. The solution in the tank will thus be progressively chlorinated.

In the operation of the apparatus illustrated, the alkaline solution, for example, milk-of-lime, is introduced into the mixing tank 1 which may be e. g. about 20 feet deep and which may have a capacity of say 12,000 gallons. The liquid chlorine from the 1 ton container 21 is introduced in regulated amount through the expansion valve 24. The valves in the pipe 8 and 10 will be closed and those in the pipe 3 and 6 open, and the pump 4 will be in operation. The alkaline solution will be drawn from the mixing tank through the suction pipe 3 and the chlorine gas escaping through the expansion valve 24 will enter this stream and be drawn into the pump with it and the liquid chlorine and solution will be intimately admixed by the pump and the mixture will be discharged through the line 7 back to the tank 1. This circulation will be continued until the alkaline solution has been chlorinated to the desired degree.

With a rapidly rotating centrifugal pump, the chlorine introduced in liquid form, or partly in liquid form and partly as vaporized chlorine, will be subjected to vigorous agitation in the pump. The cooling effect of the liquid chlorine will be exerted upon the solution with which it is admixed, and will to a considerable extent neutralize the heat of reaction between the chlorine and the milk-of-lime or other alkaline solution.

When the solution has been chlorinated to the desired degree, as determined by test, or by the introduction of predetermined amounts of chlorine into a predetermined amount of milk-of-lime, the chlorine supply is cut off and the circulation of the pump is stopped, and the solution is permitted to settle to free it from undissolved lime or other impurities which can be drawn off through the clean-off pipe 19. The clear settled chlorinated liquor can be drawn off through the pipe 9, the upper end of which may be lowered for this purpose. In this case, the valve in the pipe 3 and 6 will be closed and those in the pipe 8 and 10 open, and the clear solution will be pumped into the stock tank or storage tank 14 from which it can be withdrawn as desired through the pipe 15 and 17.

It will thus be seen that the present invention makes use of the cooling effect of the liquid chlorine, and utilizes the chlorine directly while still in a liquid state, by introducing it directly into the liquid or solution to be chlorinated, with thorough agitation of the liquor and chlorine, or sufficiently intimate dissemination of the chlorine throughout the liquor, so that effective reaction and absorption of the chlorine by the solution takes place.

The invention is of more or less general application to the production of bleach solutions by chlorinating milk-of-lime or by chlorinating solutions of other alkaline substances; and involves the direct introduction of liquid chlorine into the solution to be chlorinated and the thorough dissemination of the liquid chlorine into the solution to bring about effective reaction contact, which intimate contact may advantageously be effected by introducing the liquid chlorine into a circulating stream of the milk-of-lime or other solution and by utilizing a centrifugal pump or other mechanical agitating device for bringing about the intimate distribution of the chlorine throughout the flowing stream of milk-of-lime or other solution.

I claim:

1. The method of chlorinating solutions which comprises circulating the solution to be chlorinated through a circulating pump, introducing chlorine, the major portion of which is in a liquid state, directly into the stream circulating through the pump, and causing intimate admixture of the chlorine and solution within the circulating pump.

2. The method of preparing bleached solutions by subjecting alkaline solutions to the action of chlorine which comprises circulating the alkaline solution by means of a circulating pump, introducing chlorine, the major portion of which is in a liquid state, directly into the solution circulating through the pump, and causing the introduced chlorine and solution to be intimately admixed within the circulating pump.

3. The method of preparing bleach solutions by subjecting alkaline solutions to the action of chlorine which comprises circulating the alkaline solution from and to a mixing tank through a circulating pump, supplying chlorine, the major portion of which is in a liquid state, directly to the circulating liquor, and causing the chlorine to be intimately admixed with the solution within the pump.

In testimony whereof I affix my signature.

JAMES H. MacMAHON.